US010589649B1

(12) United States Patent
Oleson et al.

(10) Patent No.: US 10,589,649 B1
(45) Date of Patent: Mar. 17, 2020

(54) LINKAGE EXTENSION SYSTEM WITH DAMPED MOTION

(71) Applicant: Rockwell Collins, Inc., Cedar Rapids, IA (US)

(72) Inventors: Michael L. Oleson, Parkland, FL (US); John Iossifidis, Miami, FL (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 16/128,773

(22) Filed: Sep. 12, 2018

(51) Int. Cl.
| | | |
|---|---|---|
| *B60N 2/02* | (2006.01) |
| *B60N 2/18* | (2006.01) |
| *B60N 2/22* | (2006.01) |
| *B60N 2/23* | (2006.01) |
| *B60N 2/80* | (2018.01) |
| *B60N 2/806* | (2018.01) |
| *B60N 2/821* | (2018.01) |
| *B60N 2/829* | (2018.01) |
| *B60N 3/06* | (2006.01) |
| *A47C 7/38* | (2006.01) |
| *A47C 7/50* | (2006.01) |
| *B60N 2/90* | (2018.01) |
| *B60N 2/62* | (2006.01) |
| *A47C 7/14* | (2006.01) |

(52) U.S. Cl.
CPC .............. *B60N 2/829* (2018.02); *A47C 7/14* (2013.01); *A47C 7/38* (2013.01); *A47C 7/5062* (2018.08); *B60N 2/62* (2013.01); *B60N 2/995* (2018.02); *F16F 2222/126* (2013.01); *F16F 2232/02* (2013.01)

(58) Field of Classification Search
CPC ........ B60N 2/0284; B60N 2/829; B60N 2/62; B60N 2/995
USPC ............ 297/284.11, 423.19, 423.2, 353, 410
See application file for complete search history.

(56) References Cited

U.S. PATENT DOCUMENTS

| | | | | |
|---|---|---|---|---|
| 5,171,062 A * | 12/1992 | Courtois | ................ | B60N 2/62 297/284.11 X |
| 6,926,361 B2 * | 8/2005 | Link | .................... | A47C 1/023 297/284.11 |
| 7,614,693 B2 * | 11/2009 | Ito | ...................... | B60N 2/0284 297/284.11 |
| 8,016,355 B2 * | 9/2011 | Ito | .......................... | B60N 2/62 297/284.11 |
| 8,272,687 B2 * | 9/2012 | Gross | ................. | B60N 2/4221 297/284.11 X |
| 8,662,595 B2 * | 3/2014 | Kramer | ................ | A47C 1/022 297/284.11 |
| 8,894,142 B2 * | 11/2014 | Alexander | ............ | B60N 2/876 297/410 X |
| 9,016,785 B2 * | 4/2015 | Freisleben | .......... | B60N 2/0232 297/284.11 |
| 2001/0004164 A1 * | 6/2001 | Mattsson | ............ | B60N 2/0284 297/284.11 |

(Continued)

*Primary Examiner* — Rodney B White
(74) *Attorney, Agent, or Firm* — Suiter Swantz pc llo

(57) ABSTRACT

A linkage extension system and method for holding an extendable portion of a seat in a desired position while the extendable portion translates from a retracted to an extended position and any intermediate position. A coupled damper produces a holding force to counter gravity or other forces which cause the translation of the seat extension away from a desired position. The linkage extension system is self-powered and operates within the enclosed portion of the seat.

20 Claims, 12 Drawing Sheets

(56) References Cited

U.S. PATENT DOCUMENTS

| | | | |
|---|---|---|---|
| 2011/0175422 A1* | 7/2011 | Bruck | B60N 2/20 |
| | | | 297/410 |
| 2015/0108811 A1* | 4/2015 | Muehlbauer | B60N 2/143 |
| | | | 297/344.21 |
| 2017/0267141 A1* | 9/2017 | Line | B60N 2/62 |
| 2017/0291522 A1* | 10/2017 | Line | B60N 2/62 |
| 2017/0291523 A1* | 10/2017 | Line | B60N 2/0232 |
| 2018/0099595 A1* | 4/2018 | Kondrad | B60N 2/929 |
| 2019/0184858 A1* | 6/2019 | Anzenberger | B60N 2/0284 |

\* cited by examiner

LINKAGE EXTENSION SYSTEM WITH DAMPED MOTION

CROSS-REFERENCE TO RELATED APPLICATIONS

The present application is related to United States Patent Application No. 16/128,749 entitled "EXTENSION ASSIST FOR HEADREST" filed Sep. 12, 2018, and United States Patent Application No. 16/129,212 entitled "MULTI-STAGE SEATBACK EXTENSION SYSTEM" filed Sep. 12, 2018, both of which are incorporated herein by reference in their entirety.

BACKGROUND

Traditional seat extension systems may include an extendable support portion which may be heavy or difficult to translate from a retracted position to an extended position. Particularly, a movement in the vertical from retracted to extended of a head rest extendable support may require excessive force by a user. Once in position, the extendable support may translate to an undesired position being acted upon by outside forces.

Some seat extensions may include multiple moving parts to accurately support differing body shapes. These seat extensions may be of substantial mass and become prone to inadvertent movement once placed in the desired position.

In addition to a head rest extension, a seat pan or leg rest extension may be under lateral forces causing undesired movement from a desired position.

An adequately supported user may be a requirement of a particular seat. In a commercial passenger aircraft application, personal comfort may be of primary concern. In a commercial pilot seat, a safely restrained pilot of differing size may be a requirement of a certification agency. Further, a precisely conformed seat may offer a military pilot increased probability of a successful and uninjured ejection from a high-performance aircraft. Any moving vehicle may require a seat including movable extensions to adequately support and secure the human occupant.

Therefore, a need remains for a system and method for maintaining a desired translation position of a seat extension in a retracted position, an extended position and an unlimited number of intermediate positions to adequately support and secure the human occupant.

SUMMARY

Accordingly, a linkage extension system may comprise a movable cross member of a seat movably coupled to a stationary member of the seat, the stationary member rigidly coupled to the seat. The movable cross member configured to translate along a movement plane to at least one of an extended position, a retracted position, and any intermediate position. The retracted position is proximal to the seat and the extended position and the intermediate positions are more distant from the seat.

The linkage extension system may also include a pair of lower links rotationally coupled at a lower pivot joint with the stationary member, the pair of lower links configured to rotate within the movement plane. The linkage extension system may include a pair of upper links rotationally coupled at an upper pivot joint with the movable cross member, the pair of upper links configured to rotate within the movement plane, the upper links and the lower links coupled to each other via a link pivot joint.

For translation restriction, a damper may be operably coupled to 1) the movable cross member, 2) one of the lower links, 3) one of the upper links, 4) a link pivot joint and 5) the stationary member. Here, the damper may be configured to provide a holding force, the holding force restricting translation of the movable cross member as the movable cross member is in any position. The damper operates to restrict translation of the movable cross member in any of the extended position, the retracted position and any intermediate position.

In additional embodiments, the holding force may be supplied by a helix shaft rotationally secured to the stationary member via a helix fixed nut, the helix shaft operatively coupled with the movable cross member via a rotary damper, the helix shaft providing the holding force directly to the movable cross member. In another embodiment, the damper may comprise a rotary damper rigidly coupled to the stationary member and operably coupled with at least one lower link, the at least one rotary damper providing the holding force directly upon the at least one lower link.

In an additional embodiment, the holding force may be supplied by a rotary damper rigidly coupled to the movable cross member and operably coupled to one or more an upper links. In another, the holding force is supplied by a gas spring damper rotationally coupled with the stationary member and operably coupled with an opposite link pivot joint, the gas spring damper providing the holding force directly upon the opposite link pivot joint.

An additional embodiment of the inventive concepts disclosed herein may comprise a method for extension and retraction of an extendable portion of a seat. The method may comprise translationally coupling a movable cross member to a seat, the movable cross member translationally coupled to a stationary member of the seat, the stationary member rigidly coupled to the seat, the movable cross member configured to translate along a movement plane to an extended position, a retracted position, and any intermediate position. The retracted position proximal to the seat and the extended position and each intermediate position distant from the seat.

The method may also comprise rotationally coupling a pair of lower links via a lower pivot joint with the stationary member, the pair of lower links configured to rotate within the movement plane. The method may further comprise rotationally coupling a pair of upper links via an upper pivot joint with the movable cross member, the pair of upper links configured to rotate within the movement plane, the upper links and the lower links coupled to each other via a link pivot joint. The method may comprise operably coupling a damper to 1) the movable cross member, 2) one or more of the lower links, 3) one or more upper link, 4) a link pivot joint and 5) the stationary member. Here, the damper is configured to provide a holding force restricting translation of the movable cross member as the movable cross member is in the extended position, the retracted position and any intermediate position.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description may refer to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1A:
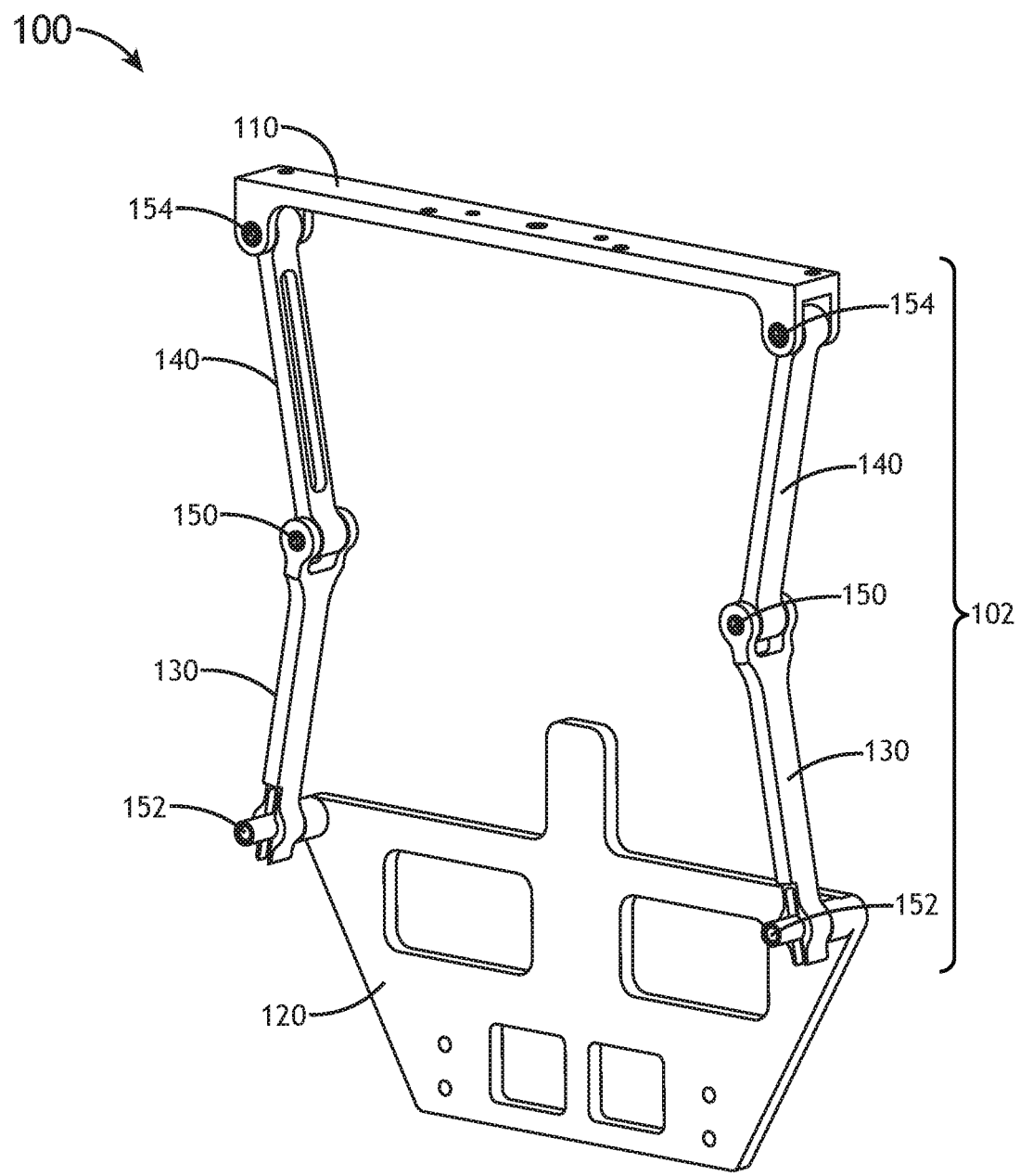
FIG. 1A is a diagram of a linkage extension system in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Embodiments of the inventive concepts disclosed herein are directed to a linkage extension system and method for holding an extendable portion of a seat in a desired position while the extendable portion translates from a retracted to an extended position and any intermediate position. A coupled damper produces a holding force to counter gravity or other forces which cause the translation of the seat extension away from a desired position. The linkage extension system is self-powered and operates within the enclosed portion of the seat.

| Reference Chart | |
|---|---|
| Ref. No. | Description |
| 100 | Linkage Extension System |
| 102 | Extension Assembly |
| 106 | Extension Assist Assembly |
| 110 | Movable Cross Member |

-continued

Reference Chart

| Ref. No. | Description |
| --- | --- |
| 112 | Extension Force |
| 114 | Retraction Force |
| 118 | Movement Plane |
| 120 | Stationary Member |
| 130 | Lower Link |
| 140 | Upper Link |
| 150 | Link Pivot Joint |
| 152 | Lower Pivot Joint |
| 154 | Upper Pivot Joint |
| 200 | Rotary Damper with Helix Shaft and Fixed Nut |
| 210 | Helix Shaft |
| 212 | Helix Fixed Nut |
| 214 | Rotary Damper |
| 216 | Helix Shaft Screw |
| 300 | Rotary Damper System |
| 310 | Lower Rotary Damper |
| 312 | Upper Rotary Damper |
| 400 | Gas Spring Damper System |
| 410 | Gas Spring Damper |
| 412 | Stationary Member Attachment |
| 414 | Link Pivot Joint Attachment |
| 500 | Seat Pan Linkage Extension |
| 600 | Foot Rest Linkage Extension |
| 700 | Leg Rest Linkage Extension |

FIG. 1A

Referring to FIG. 1, a diagram of a linkage extension system 100 in accordance with an embodiment of the inventive concepts disclosed herein is shown. The linkage extension system 100 may broadly comprise an extension assembly 102 configured for extension to an extended position, retraction to a retracted position and positioning in any intermediate position in between.

Structurally, the linkage extension system 100 may comprise a stationary member 120 including one or more lower pivot joints 152. The stationary member 120 may be operably coupled with the extension assembly 102 via the lower pivot joints 152. The extension assembly 102 may comprise lower links 130, a pivot joint 150 an upper link 140 operably coupled with a movable cross member 110 via an upper pivot joint 154.

It is contemplated, in one embodiment of the inventive concepts disclosed herein, the linkage extension system 100 may be incorporated within and enclosed portion of a seat. The enclosed portion of the seat may include multiple translatable compartments with the stationary member 120 within a fixed portion of the seat and the movable cross member 110 within a movable portion of the seat.

In operation, FIG. 1A shows the extension assembly 102 in the extended position with both links, lower 130 and upper 140, at a maximum extension of less than 180 degrees. It is contemplated herein, a stop may be incorporated within one or more of the lower 152, upper 154 and link 150 pivot joints to keep the lower and upper links from reaching a fully extended (180 degree) position where they are linearly aligned.

In retraction, the lower links 130 and upper links 140 may collapse toward each other, with a distance between the link pivot joints 150 decreasing, to move the movable cross member 110 from the extended to the retracted position.

In extension, the distance between the link pivot joints 150 may increase while the movable cross member 110 extends distally from the stationary member 120.

FIG. 1B

Figure 1B:
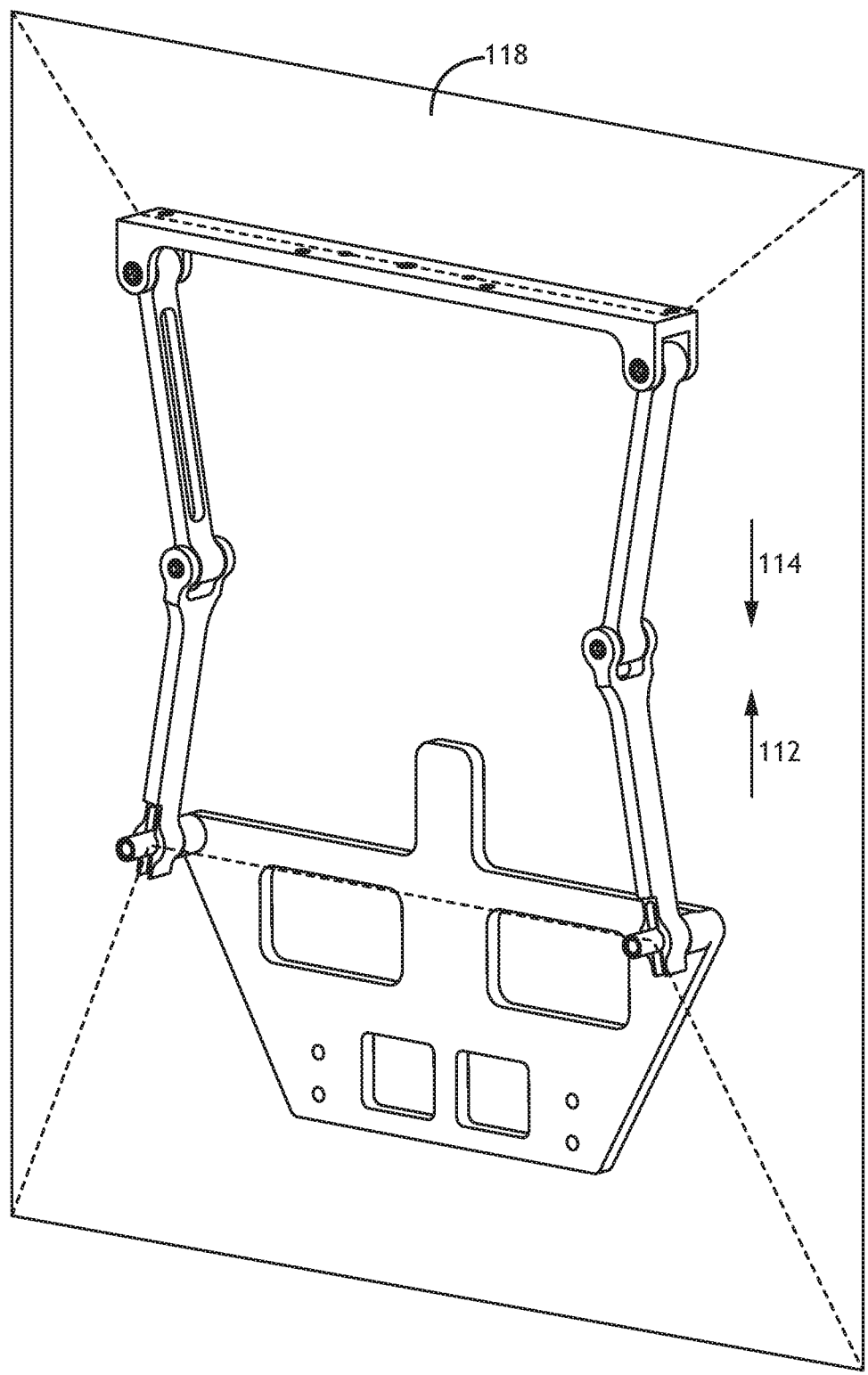
FIG. 1B is a diagram of a plane of movement associated with the linkage extension system in accordance with an embodiment of the inventive concepts disclosed herein.

Referring to FIG. 1B, a diagram of the linkage extension system 100 in accordance with an embodiment of the inventive concepts disclosed herein is shown. The linkage extension system 100 may function within a movement plane 118 in extension and retraction. An extension force 112 and a retraction force 114 may operate on the movable cross member 110. Both the extension force 112 and the retraction force 114 may operate upon the movable cross member 110 as the movable cross member 110 may translate. It is contemplated herein, the movable cross member 110 may remain within the movement plane 118 as it translates from retracted to extended. Also, the movable cross member 110 may maintain its orientation relative to the stationary member 120 as it translates along the movement plane 118.

The movable cross member 110 may translate in an extension direction equal to the direction of the extension force 112 and also in a retraction direction equal to the direction of the retraction force 114. In some embodiments, the retraction force 114 may be approximately equal to the extension force 112, causing the movable cross member 110 to remain at rest until an outside force acts upon the movable cross member 110.

The following embodiments may illuminate some exemplary systems which supply a holding force acting against each of the extension force 112 and the retraction force 114 and designed to inhibit translation of the movable cross member while in any position. The holding force may act within the movement place and act in a direction equal to and opposite from each of the extension 112 and retraction 114 forces. In embodiments, the extension assembly 102 may be enclosed within a seat with no access one installed. In each of the contemplated embodiments herein, the holding force requires 1) no external power source, 2) no switch, 3) no maintenance for operation and 4) resides enclosed within the structure of the seat headrest or additional portions of the seat as detailed below.

The holding force may act upon the movable cross member 110 to inhibit translation. The holding force does not operate to lock the movable cross member 110 in place. Rather, it keeps the movable cross member 110 in any position and resists translation once a user discontinues action upon the movable cross member. In this manner, a manufacturer may design the proper amount holding force for the desired result.

FIG. 2A

Figure 2A:
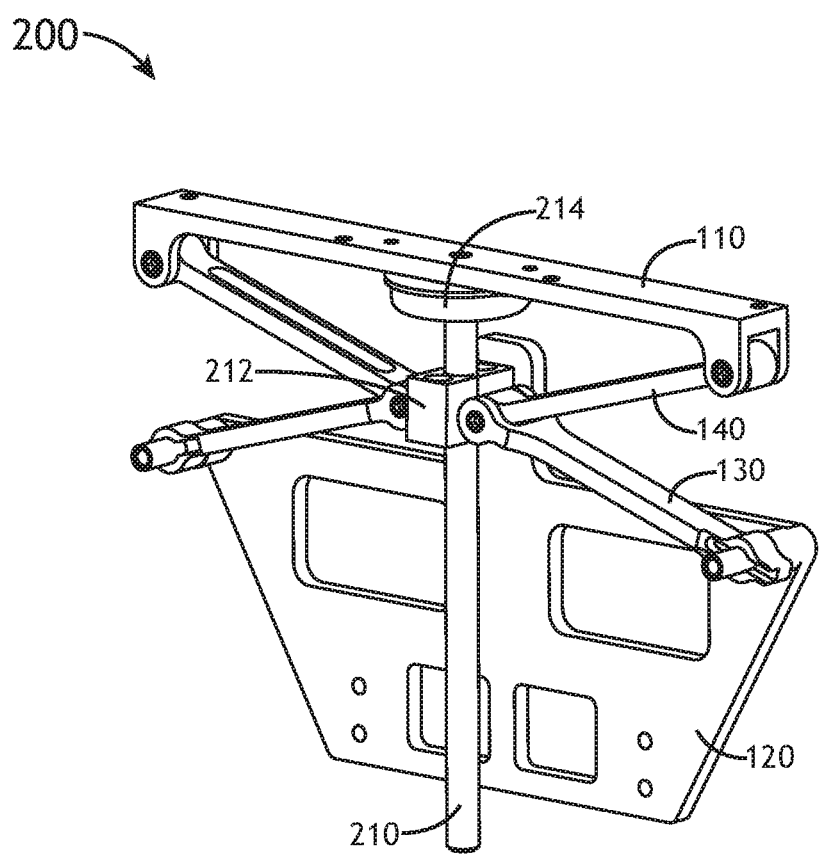
FIG. 2A is a diagram of a rotary damper with helix shaft and fixed nut in accordance with an embodiment of the inventive concepts disclosed herein.

Referring to FIG. 2A, a diagram of a rotary damper with helix shaft and fixed nut 200 in accordance with an embodiment of the inventive concepts disclosed herein is shown. In one embodiment, a helix shaft 210 may provide the holding force to operably inhibit translation of the movable cross member 110 while in any position.

The helix shaft 210 may be operatively coupled with the movable cross member 110 via a rotary damper 214. The rotary damper 214 may operate to inhibit rotation of the helix shaft and act against each of the extension force 112 and retraction force 114. The helix shaft 210 may also be operatively coupled with stationary member 120 via a helix fixed nut 212. The helix fixed nut 212 may operate to 1) secure the helix shaft 210 to the stationary member 120 and 2) cause the helix shaft 210 to rotate as the extension assembly 102 is moved in either direction. In one embodiment, the helix fixed nut 212 is configured with internal threads as an internal surface of the helix fixed nut 212 interacts with an exterior surface of the helix shaft 210.

FIG. 2B

Figure 2B:
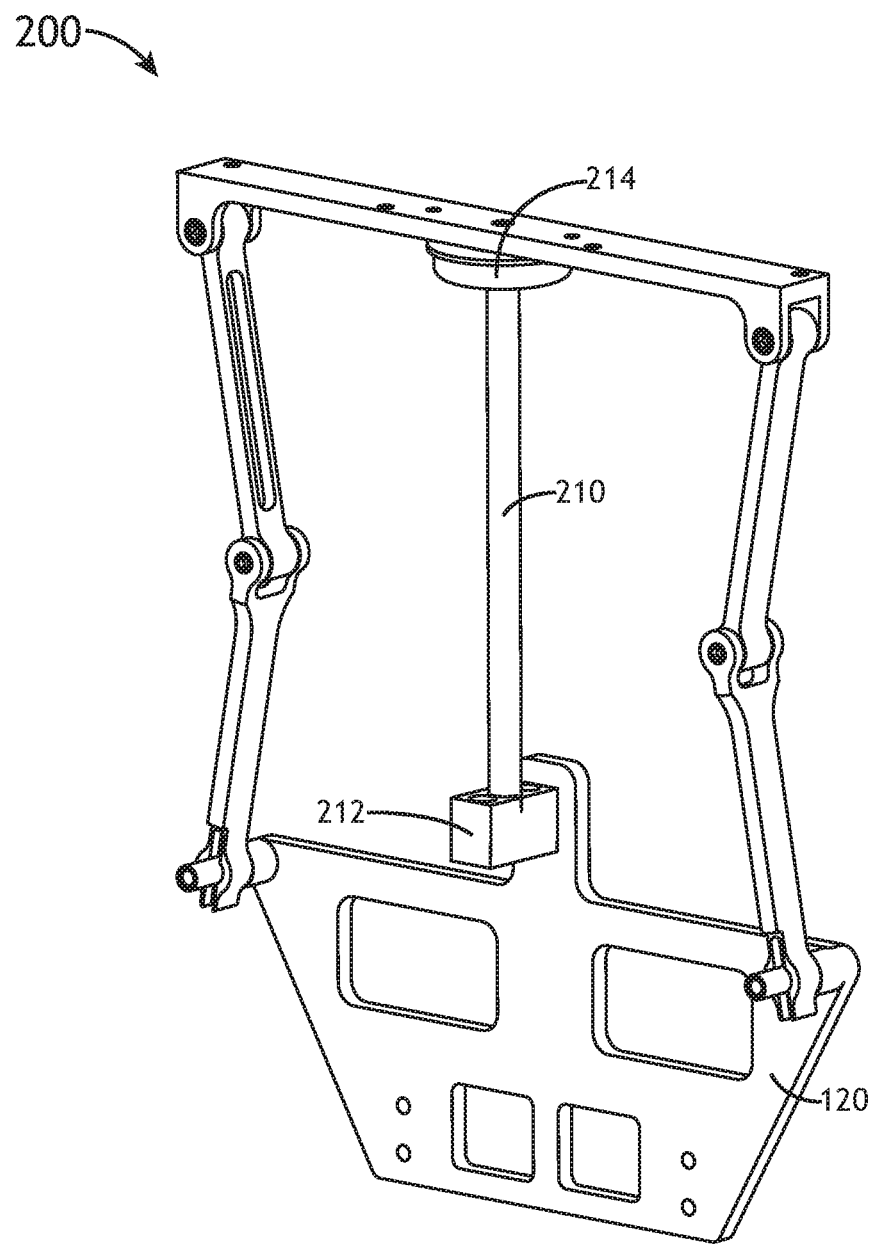
FIG. 2B is a diagram of an extended rotary damper with helix shaft and fixed nut in accordance with an embodiment of the inventive concepts disclosed herein.

Referring to FIG. 2B, a diagram of the rotary damper with helix shaft and fixed nut 200 with the extension assembly 102 in the extended position in accordance with an embodiment of the inventive concepts disclosed herein is shown. While in the extended position, the helix shaft 210 operates to create the holding force to hold the movable cross member 110 in the extended position distally from the stationary member 120.

FIG. 2C

Figure 2C:
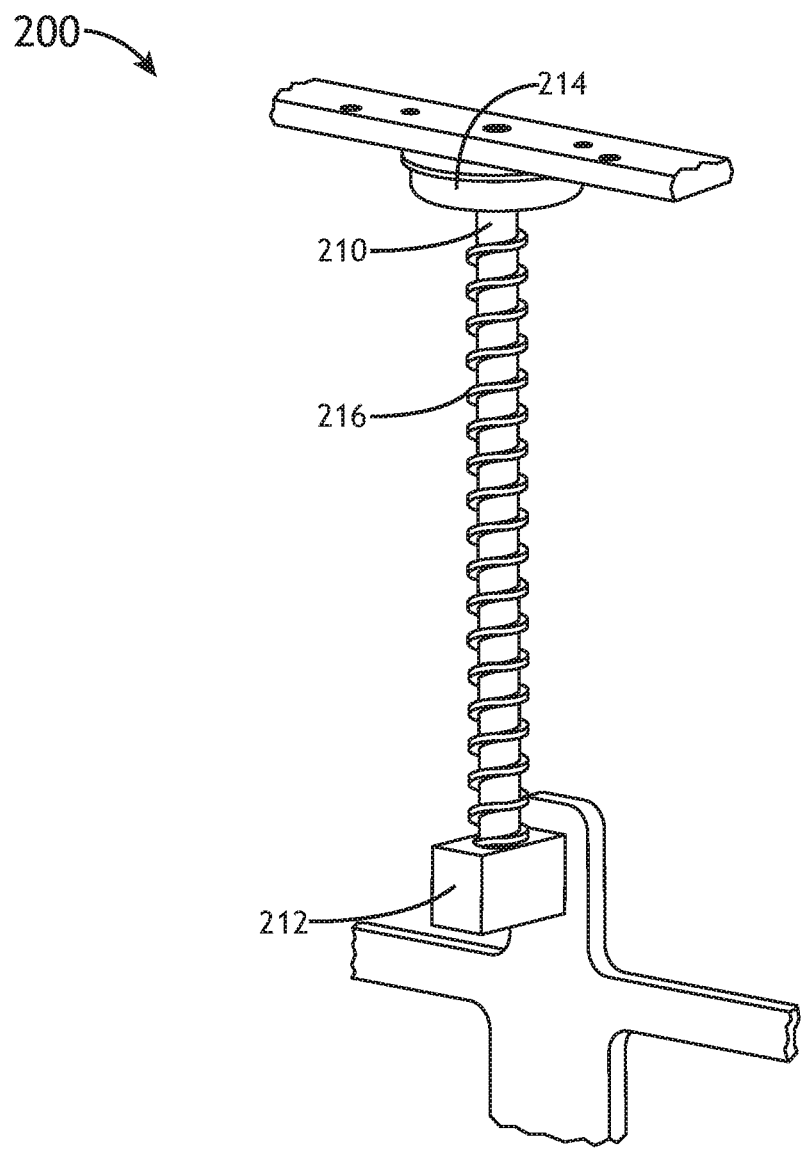
FIG. 2C is a diagram of a plane of movement associated with the linkage extension system in accordance with an embodiment of the inventive concepts disclosed herein.

Referring to FIG. 2C, a detail diagram of the rotary damper with helix shaft and fixed nut 200 in accordance with an embodiment of the inventive concepts disclosed herein is shown. A helix shaft screw 216 may operate associated with the helix shaft 210 to cause rotation of the rotary damper 214. During translation of the movable cross member 110, the rotary damper 214 may rotate the helix shaft 210 thereby causing the helix shaft screw 216 to impact internal threads within the helix fixed nut 212 causing the holding force.

In one embodiment, the linkage extension system 100 may be operationally installed within the back of a seat. The stationary member 120 may be securely fixed within the upper back of the seat while the movable cross member 110 may be translationally coupled with the stationary member 120 as well as securely fixed to a head rest. In this configuration, gravity may be a majority of the retraction force 114 with friction being a lesser portion. The rotary damper may operate to create the holding force and keep the movable cross member 110 in the desired position.

FIG. 3A

Figure 3A:
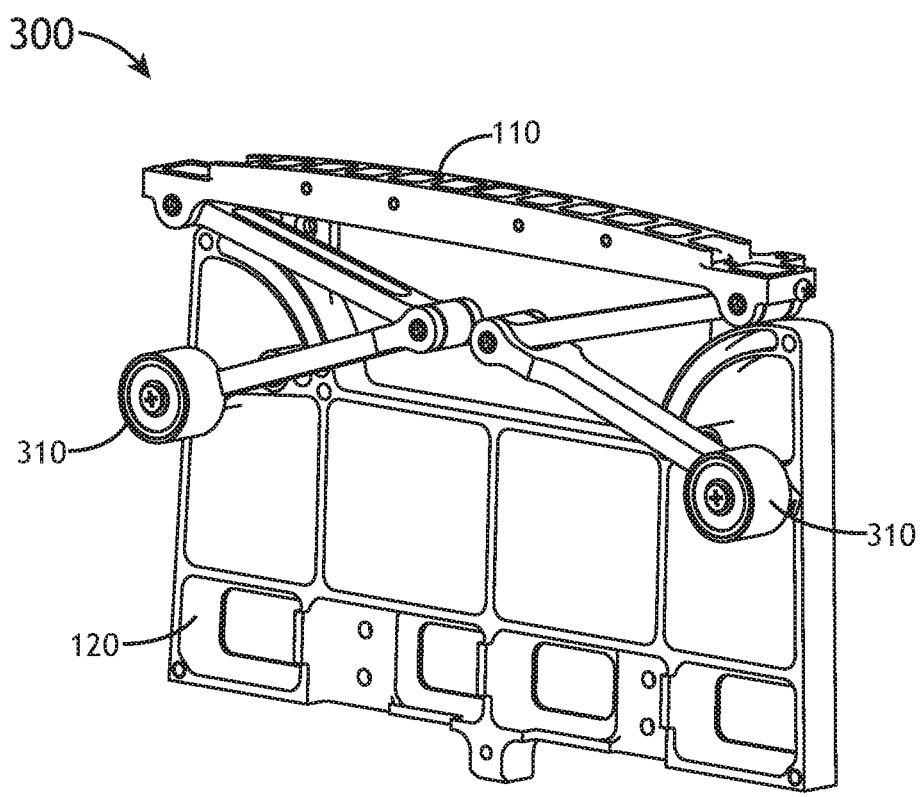
FIG. 3A is a diagram of a rotary damper system exemplary of an embodiment of the inventive concepts disclosed herein.

Referring to FIG. 3A, a diagram of a rotary damper system 300 exemplary of an embodiment of the inventive concepts disclosed herein is shown. The rotary damper system 300 may employ one or more lower rotary dampers 310 to provide the holding force. Lower rotary dampers 310 may be fixed to the stationary member 120 while operatively coupled with one or more lower links 130. Each coupled lower rotary dampers 310 may operate to transfer rotary (torque) to the coupled lower link 130. In translation in either the extension direction or retraction direction, the lower rotary dampers 310 may operate to provide the holding force necessary to inhibit the movable cross member 110 from translating to an undesired position.

FIG. 3B

Figure 3B:
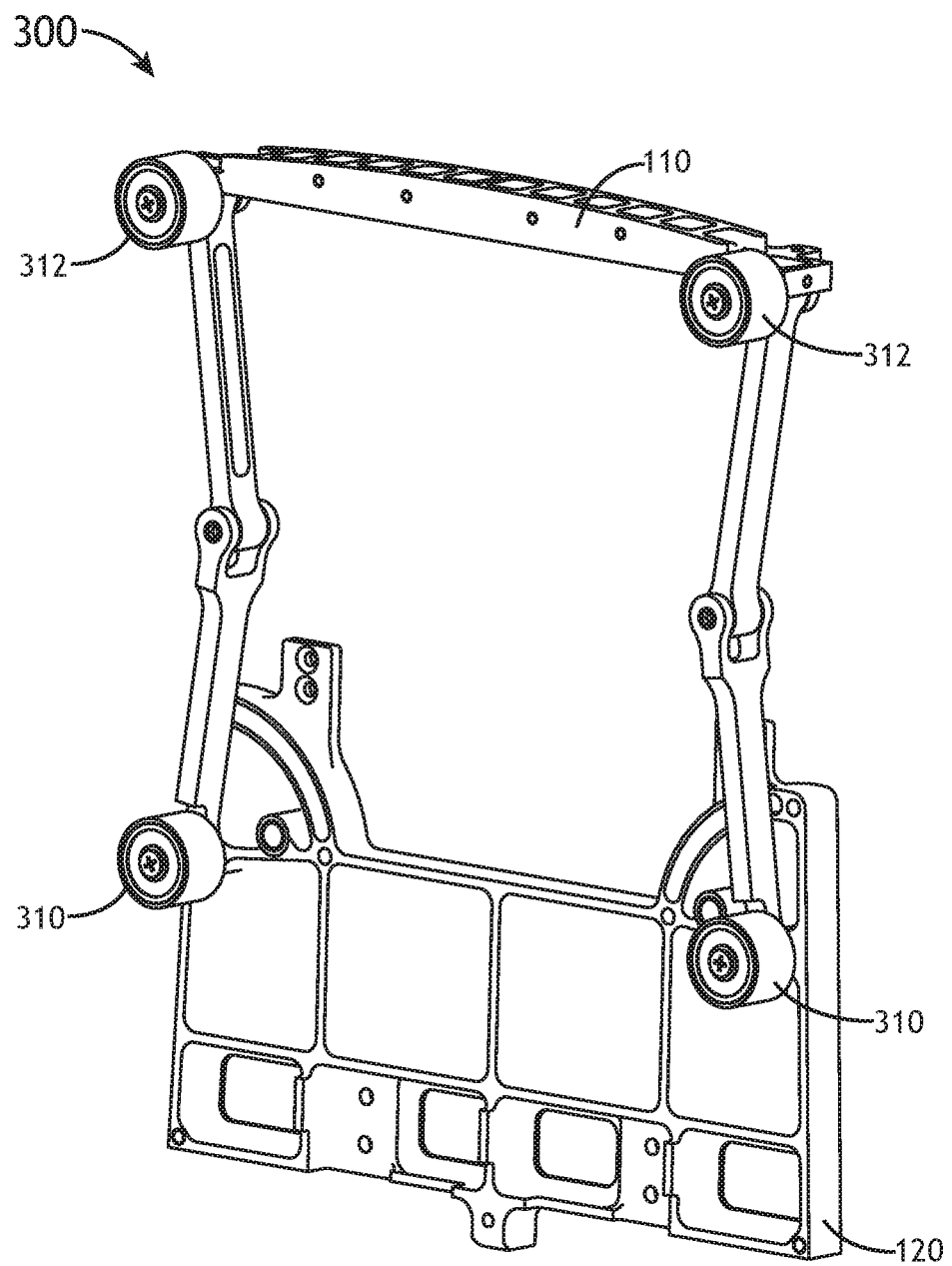
FIG. 3B is a diagram of an extended rotary damper system exemplary of an embodiment of the inventive concepts disclosed herein.

Referring to FIG. 3B, a diagram of the rotary damper system 300 at an extended position exemplary of an embodiment of the inventive concepts disclosed herein is shown. In extension, the extension assembly 102 moves distally from the stationary member. Each lower rotary damper 310 may produce torque upon each associated lower and/or upper link to produce a combined holding force eventually acting upon the movable cross member 110.

In one embodiment, a single lower or upper rotary damper 310/312 may be sufficient to create a desired holding force. In another embodiment, a plurality of lower/upper rotary dampers 310/312 may operate in concert to create the desired holding force. In another embodiment, rotary spring dampers may also be sited at the link pivot joint 150 (not pictured) fixed to a lower (or upper) link and applying torque upon the upper (or lower) link to create the desired holding force. Contemplated herein, each of the plurality of rotary spring dampers may be of equal or unequal size to offer a manufacturer flexibility to design the exact holding force desired.

FIG. 4A

Figure 4A:
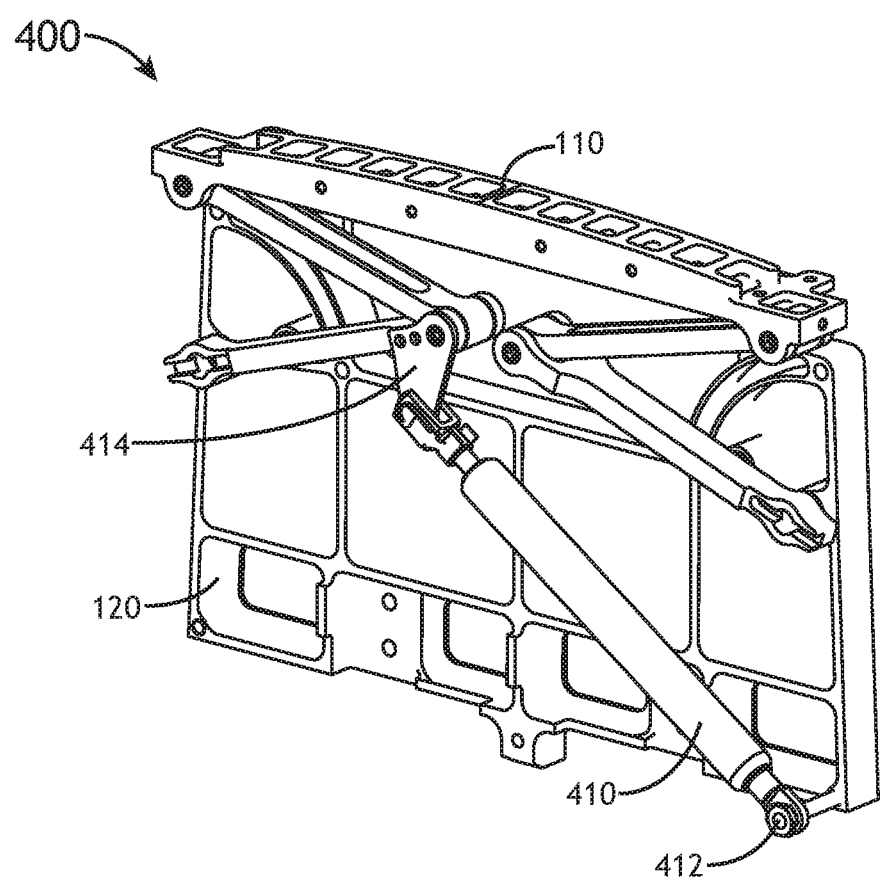
FIG. 4A is a diagram of a gas spring damper system exemplary of one embodiment of the inventive concepts disclosed herein.

Referring to FIG. 4A, a diagram of a gas spring damper system 400 in the retracted position exemplary of one embodiment of the inventive concepts disclosed herein is shown. In one embodiment, a gas spring 410 may be coupled with one of the link pivot joints 150 to produce the desired holding force. The gas spring 410 may be rotationally coupled to the stationary member 120 via a stationary member attachment 412 and to the link pivot joint via a link pivot joint attachment 414.

The link pivot joint attachment 414 may be configured of a shape to allow unencumbered movement of the lower and upper links 130 140 to the desired extended position. For example, an elongated link pivot joint attachment 414 may operate to keep the gas spring 410 from impacting the lower link 120 during operation. Further, an extended link pivot joint attachment 414 may allow a manufacturer flexibility in construction to conform to a specific extension type (e.g., headrest, seat pan, arm rest) or size (e.g., large foot rest, small arm rest) and allow for alternate lengths of the gas spring 410.

In operation, the gas spring 410 may, in the retracted position, remain neutral. In this manner, the movable cross member may remain at rest while the extension assembly 102 is in the retracted position. During extension, the user may apply an extension force 112 to the extension assembly 102 overcoming the holding force and any other retraction forces (e.g., gravity) allowing the movable cross member 110 to move distally from the stationary member 120.

Embodiments of the inventive concepts disclosed herein may operate to produce the holding force acting opposite to the extension 112 or retraction 114 force throughout the movement of the extension assembly 102 from extended to retracted and vice versa. In this manner, a user may stop applying force in either direction to the extension assembly 102 and the system is configured to maintain an intermediate position between fully extended and fully retracted.

FIG. 4B

Figure 4B:
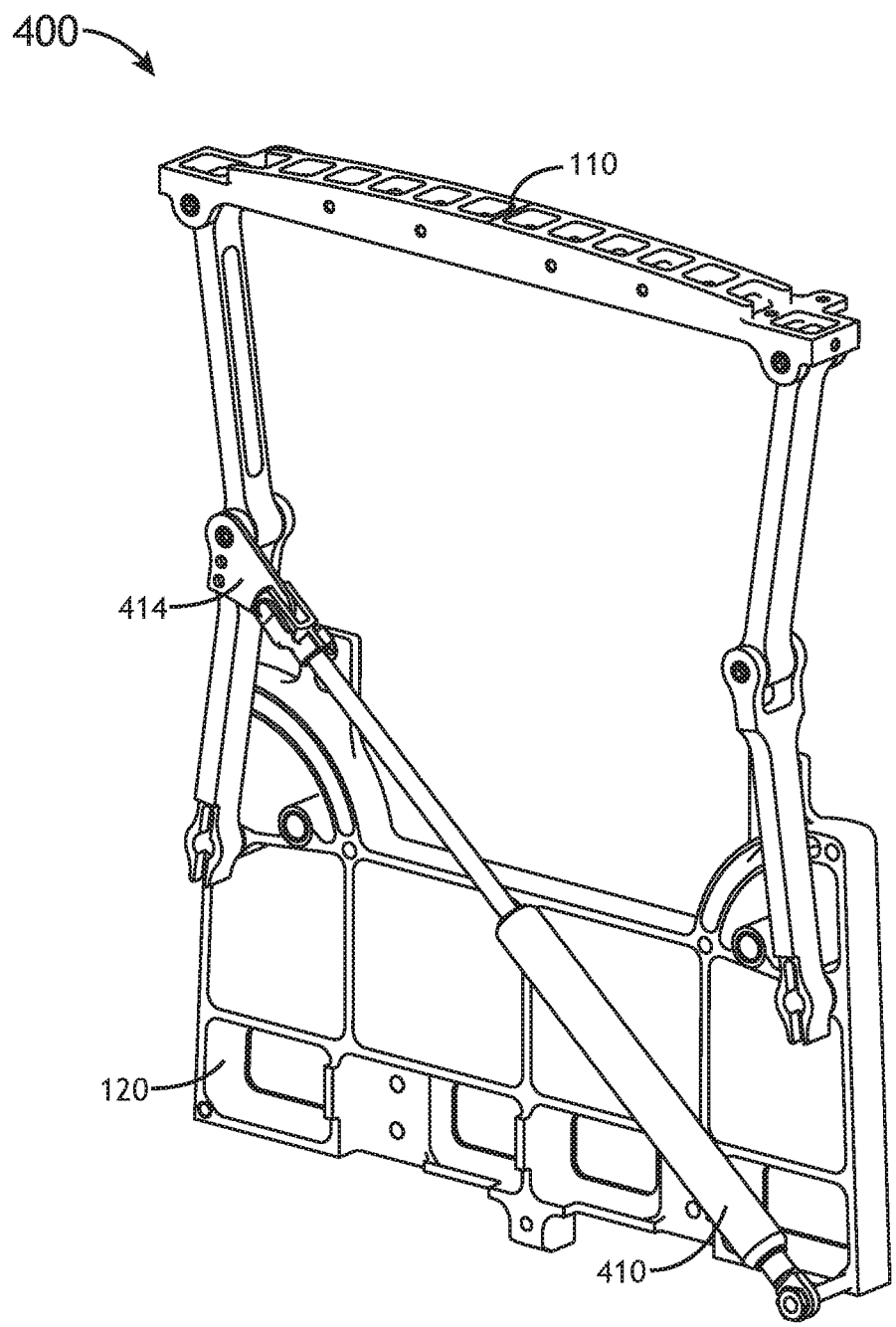
FIG. 4B is a diagram of an extended gas spring damper system exemplary of one embodiment of the inventive concepts disclosed herein.

Referring to FIG. 4B, a diagram of a gas spring damper system 400 in the extended position exemplary of one embodiment of the inventive concepts disclosed herein is shown. In one embodiment, the link pivot joint attachment may be fixedly coupled with the lower link 130 and rotationally coupled with the gas spring 410. In another embodiment, the link pivot joint attachment 414 may allow flexibility by rotationally coupling with each of the link to which it is coupled (lower 130 and/or upper 140) and the gas spring 410.

In an additional embodiment, the gas spring 410 may couple between the movable cross member 110 and one or more link pivot joints to produce the desired holding force. Yet another embodiment may include a plurality of gas springs 410 coupled between the stationary member 120 and link pivot joints 150 as well as between the movable cross member 110 and link pivot joints 150. In this manner, the operator may maintain flexibility in design and operation to create the desired holding force within a desired form factor.

FIG. 5A

Figure 5A:
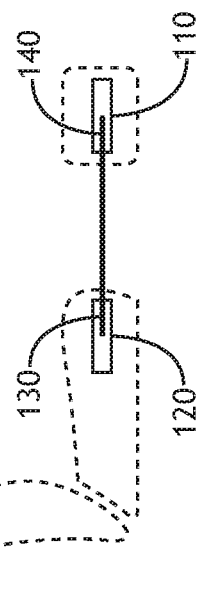
FIG. 5A is a diagram of a seat pan fitted with a linkage extension system in accordance with one embodiment of the inventive concepts disclosed herein.

Referring to FIG. 5A, a diagram of a seat pan linkage extension system 500 in the retracted position in accordance with one embodiment of the inventive concepts disclosed herein is shown. A seat pan fitted with the linkage extension system 500 may operate to conform the seat to a user with a longer anthropomorphic measurements of the upper leg. In this manner, the user's legs may be adequately supported for comfort, security or ejection.

FIG. 5B

Figure 5B:
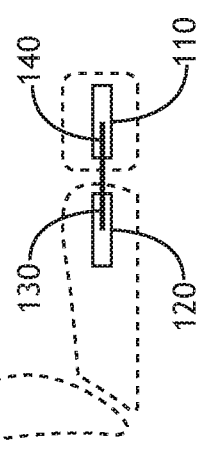
FIG. 5B is a diagram of an extended seat pan fitted with a linkage extension system in accordance with one embodiment of the inventive concepts disclosed herein.

Referring to FIG. 5B, a diagram of the seat pan linkage extension system 500 in the extended position in accordance with one embodiment of the inventive concepts disclosed herein is shown. Extended, the system 500 may offer the user adequate seat support. Here, in the horizontal configuration, gravity may be a lesser portion of the retraction force 114 than is, for example, friction as the holding force operates to inhibit the movable cross member 110 translation.

FIG. 6A

Figure 6B:
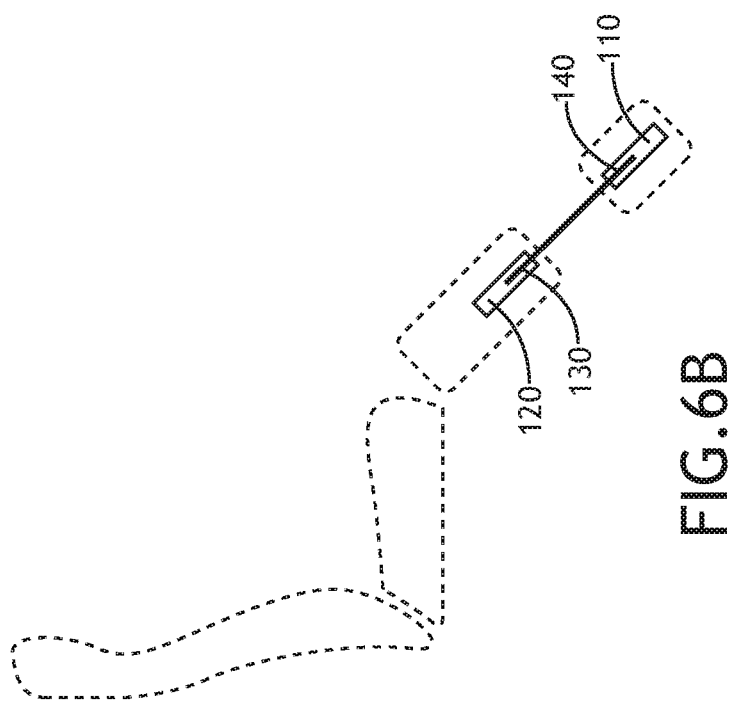
FIG. 6B is a diagram of an extended foot rest fitted with a linkage extension system associated with one embodiment of the inventive concepts disclosed herein.
Figure 6A:
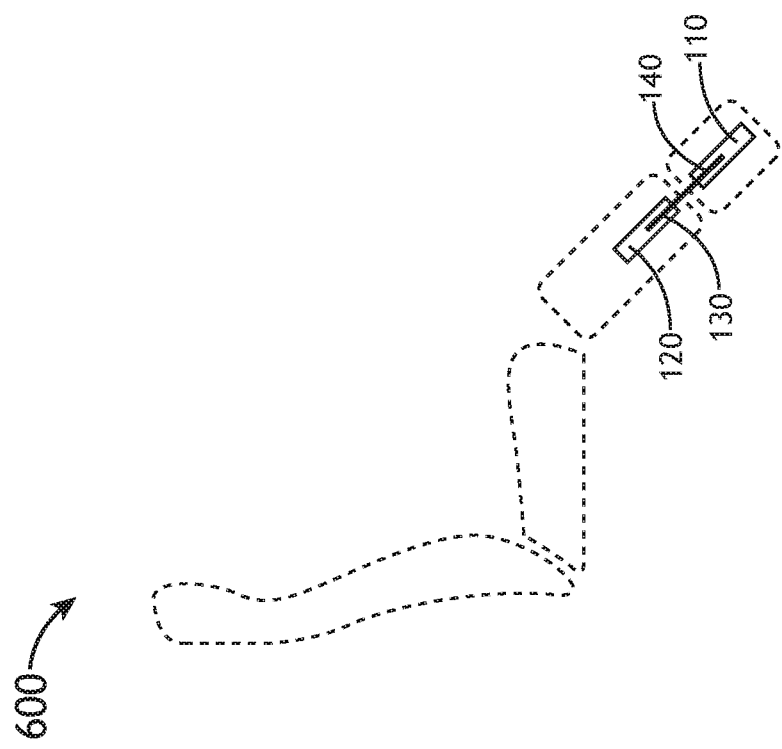
FIG. 6A is a diagram of a foot rest fitted with a linkage extension system exemplary of one embodiment of the inventive concepts disclosed herein.

Referring to FIG. 6A, a diagram of a foot rest linkage extension system 600 in the retracted position exemplary of one embodiment of the inventive concepts disclosed herein is shown. A foot rest extension system 600 may offer a user with longer legs an opportunity for leg support should the seat be in a reclined position. Proper leg support may be not only comfortable but also a medical requirement for those users prone to medical issues caused by ling term immobility. Embodiments herein may be specifically tailored to a user who may require proper lower leg support for adequate vascular circulation.

FIG. 6B

Referring to FIG. 6B, a diagram of a foot rest linkage extension system 600 in an extended position exemplary of one embodiment of the inventive concepts disclosed herein is shown. In the extended position, the linkage extension system 600 may offer the user with increased anthropomorphic measurements in the legs to become fully supported.

FIG. 7A

Figure 7A:
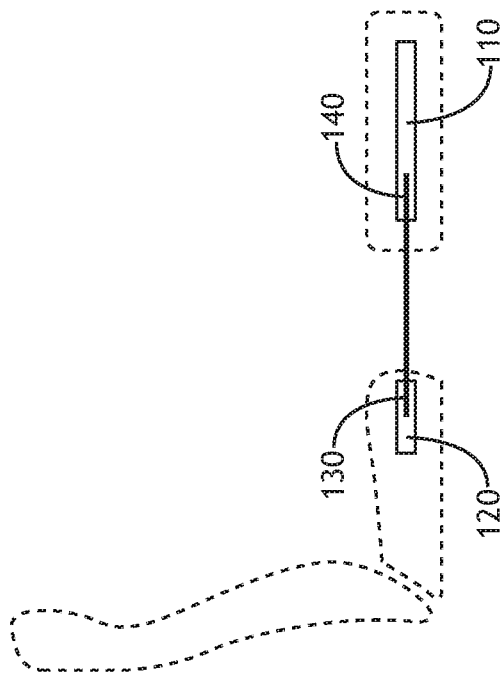
FIG. 7A a diagram of a leg rest fitted with a linkage extension system exemplary of one embodiment of the inventive concepts disclosed herein.

Referring to FIG. 7A, a diagram of a leg rest linkage extension system 700 in a retracted position exemplary of one embodiment of the inventive concepts disclosed herein is shown. In one embodiment, the leg rest fitted with a linkage extension system 700 may offer the long-legged user support of a calf portion of the legs. Further, should the leg rest here be combined with the foot rest shown in FIG. 6A, a user may be adequately supported in each portion of the legs while seated.

FIG. 7B

Figure 7B:
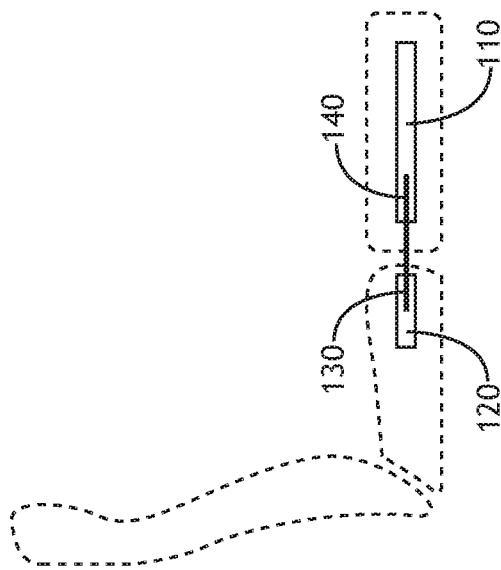
FIG. 7B a diagram of an extended leg rest fitted with a linkage extension system associated with one embodiment of the inventive concepts disclosed herein.

Referring to FIG. 7B, a diagram of a leg rest linkage extension system 700 in the extended position exemplary of one embodiment of the inventive concepts disclosed herein is shown. Extended, the system 700 may offer proper support of the lower leg areas of the user. This leg support may offer the user increased comfort and, as above, increased vascular circulation.

CONCLUSION

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or coupled with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed is:

1. A linkage extension system, comprising:
   a movable cross member of a seat, the movable cross member movably coupled to a stationary member of the seat, the stationary member rigidly coupled to the seat, the movable cross member configured to translate along a movement plane to at least one of an extended position, a retracted position, and at least one intermediate position, the retracted position proximal to the seat and the extended position and at least one intermediate position distant from the seat;
   a pair of lower links rotationally coupled at a lower pivot joint with the stationary member, the pair of lower links configured to rotate within the movement plane;
   a pair of upper links rotationally coupled at an upper pivot joint with the movable cross member, the pair of upper links configured to rotate within the movement plane, the upper links and the lower links coupled to each other via a link pivot joint; and
   at least one damper operably coupled to at least one of: 1) the movable cross member, 2) at least one lower link, 3) at least one upper link, 4) at least one link pivot joint and 5) the stationary member;
   the at least one damper configured to provide a holding force, the holding force restricting translation of the movable cross member as the movable cross member is in one of: the extended position, the retracted position and the at least one intermediate position.

2. The linkage extension system of claim 1, wherein the at least one damper further comprises a helix shaft, the helix shaft rotationally secured to the stationary member via a helix fixed nut, the helix shaft operatively coupled with the movable cross member via a rotary damper, the helix shaft providing the holding force directly to the movable cross member.

3. The linkage extension system of claim 1, wherein the at least one damper further comprises at least one rotary damper rigidly coupled to the stationary member and operably coupled with at least one lower link, the at least one rotary damper providing the holding force directly upon the at least one lower link.

4. The linkage extension system of claim 1, wherein the at least one damper further comprises at least one rotary damper rigidly coupled to the movable cross member and operably coupled to at least one upper link, the at least one rotary damper providing the holding force directly upon the at least one upper link.

5. The linkage extension system of claim 1, wherein the at least one damper further comprises at least one gas spring damper rotationally coupled with the stationary member and operably coupled with at least one opposite link pivot joint, the at least one gas spring damper providing the holding force directly upon the at least one opposite link pivot joint.

6. The linkage extension system of claim 1, wherein the holding force is less than ten pounds.

7. The linkage extension system of claim 1, wherein the holding force acts opposite from an extension force or a retraction force applied by a user, each force acts parallel to the movement plane.

8. The linkage extension system of claim 1, wherein the holding force remains one of: constant, increasing or decreasing throughout the translation from the retracted position to the extended position.

9. The linkage extension system of claim 1, wherein the holding force is sized to overcome at least one of: a gravitational force proximate with the movement plane, a lateral force approximately perpendicular to the movement plane, and a friction force within the movement plane.

10. The linkage extension system of claim 1, wherein the movable cross member is further coupled with at least one of a head rest, a foot rest, a leg support and a seat pan extension.

11. A method for extension and retraction of an extendable portion of a seat, comprising:
    translationally coupling a movable cross member to a seat, the movable cross member translationally coupled to a stationary member of the seat, the stationary member rigidly coupled to the seat, the movable cross member configured to translate along a movement plane to at least one of an extended position, a retracted position, and at least one intermediate position, the retracted position proximal to the seat and the extended position and at least one intermediate position distant from the seat;
    rotationally coupling a pair of lower links via a lower pivot joint with the stationary member, the pair of lower links configured to rotate within the movement plane;
    rotationally coupling a pair of upper links via an upper pivot joint with the movable cross member, the pair of upper links configured to rotate within the movement plane, the upper links and the lower links coupled to each other via a link pivot joint; and operably coupling at least one damper to at least one of:
1) the movable cross member, 2) at least one lower link, 3) at least one upper link, 4) at least one link pivot joint and 5) the stationary member;

wherein the at least one damper is configured to provide a holding force, the holding force restricting translation of the movable cross member as the movable cross member is in one of: the extended position, the retracted position and the at least one intermediate position.

12. The method for extension and retraction of an extendable portion of a seat of claim 11, wherein the at least one damper further comprises a helix shaft, the helix shaft rotationally secured to the stationary member via a helix fixed nut, the helix shaft operatively coupled with the movable cross member via a rotary damper, the helix shaft providing the holding force directly to the movable cross member.

13. The method for extension and retraction of an extendable portion of a seat of claim 11, wherein the at least one damper further comprises at least one rotary damper rigidly coupled to the stationary member and operably coupled with at least one lower link, the at least one rotary damper providing the holding force directly upon the at least one lower link.

14. The method for extension and retraction of an extendable portion of a seat of claim 11, wherein the at least one damper further comprises at least one rotary damper rigidly coupled to the movable cross member and operably coupled to at least one upper link, the at least one rotary damper providing the holding force directly upon the at least one upper link.

15. The method for extension and retraction of an extendable portion of a seat of claim 11, wherein the at least one damper further comprises at least one gas spring damper rotationally coupled with the stationary member and operably coupled with at least one opposite link pivot joint, the at least one gas spring damper providing the holding force directly upon the at least one opposite link pivot joint.

16. The method for extension and retraction of an extendable portion of a seat of claim 11, wherein the holding force is less than ten pounds.

17. The method for extension and retraction of an extendable portion of a seat of claim 11, wherein the holding force acts opposite from an extension force or a retraction force applied by a user, each force acts parallel to the movement plane.

18. The method for extension and retraction of an extendable portion of a seat of claim 11, wherein the holding force remains one of: constant, increasing and decreasing throughout the translation from the retracted position to the extended position.

19. The method for extension and retraction of an extendable portion of a seat of claim 11, wherein the holding force is sized to overcome at least one of: a gravitational force proximate with the movement plane, a lateral force approximately perpendicular to the movement plane, and a friction force within the movement plane.

20. The method for extension and retraction of an extendable portion of a seat of claim 11, wherein the movable cross member is further coupled with at least one of a head rest, a foot rest, a leg support and a seat pan extension.

* * * * *